United States Patent [19]

Taylor et al.

[11] 4,409,014
[45] Oct. 11, 1983

[54] CONSTANT OIL TO WATER RATIO SHEAR SPRAY SYSTEM

[75] Inventors: Randle W. Taylor, Sylvania; Richard G. Davey, Toledo, both of Ohio

[73] Assignee: Owens-Illinois, Inc., Toledo, Ohio

[21] Appl. No.: 324,904

[22] Filed: Nov. 25, 1981

[51] Int. Cl.³ .............................................. C03B 7/10
[52] U.S. Cl. ........................................ 65/170; 65/24; 65/26; 65/169; 239/311; 239/328; 239/428
[58] Field of Search ...................... 65/24, 26, 169, 170; 239/428, 311, 328

[56] References Cited

U.S. PATENT DOCUMENTS

| | | | |
|---|---|---|---|
| 2,340,832 | 2/1944 | Damme et al. ...................... | 239/311 |
| 2,412,268 | 10/1946 | Honiss ...................................... | 65/26 |
| 4,173,305 | 11/1979 | Blankenship ..................... | 239/428 X |

Primary Examiner—Arthur D. Kellogg
Attorney, Agent, or Firm—Gerald T. Welch; Myron E. Click; David H. Wilson

[57] ABSTRACT

An apparatus for spraying an oil-water-air mixture onto a plurality of shear blades adjacent to a glass gob feeder and including a multi-compartmented mixing block, a flow meter in the water line, an oil-water ratio controller, signal means connecting the flow meter output to the ratio controller for actuating an oil injector in response to the water flow whereby a metered quantity of oil-water mixture is entrained with the air in the mixing block and individual spray nozzles are connected to each compartment.

11 Claims, 5 Drawing Figures

CONSTANT OIL TO WATER RATIO SHEAR SPRAY SYSTEM

BACKGROUND OF THE INVENTION

The lubrication of feeder shear blades have always been a problem in the production of glass hollow ware by automatic methods. The constant evolution of performance of glass machines requires a parallel progression of specific equipment, for example for dosing, mixing and circulating soluble oil and water used for cooling and lubricating shear blades. The production of good quality bottles depends to a great extent on many factors one of which is the cutting of gobs of proper weight.

Furthermore, it has become, for compliance with the Federal waste water standards, necessary to use an oil which is not soluble in water in order to be able to clean up the plant effluent. This therefore requires a system for injecting the oil in the water, and then provide sufficient control over the mixing of the two so that the resulting shear spray when entrained in air will not be overloaded with oil, or will not have sufficient cooling properties so as to ineffectively cool the blades of the shears. In practice, there is often a significant difference between the theoretical percentages of oil and water to be mixed and the actual quantity of oil actually being mixed with the water. In fact, dosing the actual percentage turns out to be a compromise between the directions received and the equipment available, governed by personal experience of the operator.

One of the important aspects of this invention is that the system provided by the invention carefully controls the ratio of the oil to the water, and regardless of the extent of, or the amount of the shear spray being used, the ratio will be maintained constant. Furthermore, the ratio of oil to water may be changed at any desired time by merely changing the setting of the control system. Once the system, however, is in operation with the ratio preset, the operation will continue to operate and provide an oil to water ratio which is constant over a complete flow range.

With the foregoing in view, it is an object of the invention to provide an apparatus for spraying an oil-water mixture on shear blades of a molten glass shearing mechanism wherein a source of oil and water are connected to a ratio controller whose output is utilized to control the amount of oil metered into the water. The oil-water mixture is fed to a distributing and mixing block along with air under pressure. The oil-water mixture entrained in the air exits from the mixing block through individual conduits leading to spray heads, one for each shear blade.

SUMMARY OF THE INVENTION

The oil to water ratio controller of the invention consists of four basic components: the major fluid flow meter, ratio controller, solenoid valves, minor fluid injectors. The flow meter senses the major flow and sends a digital signal to the ratio controller. The controller divides each signal into groups of smaller signals that represent an amount equal to one oil injection cycle. It then compares these signals to a preset ratio. Each time this number is obtained, a signal is sent to an electronic driver and the count is started over. The driver sends an electronic pulse that activates a solenoid air valve. The solenoid valve actuates one or multiple positive displacement injectors that inject the minor component of the mixture such as oil into the major fluid, in this case, water. The oil-water mixture then is fed to the valve distributing and mixing block to which air also is fed with the mixing block metering the oil-water mixture in the air together in proportion such as to provide the best air liquid mixture as a spray to the shear blades.

It has been proposed in the past to provide a mechanism for combining a substance having good lubricating, cleansing and rust-inhibiting properties with water and air to produce a relatively inexpensive spray for cooling and lubricating molten glass cutting blades. One such mechanism is disclosed in U.S. Pat. No. 2,412,268 dated Dec. 10, 1946. This patent discloses a mixture of air and water being directed in a generally fan-shaped configuration at right angles with respect to the longitudinal axis of the shear blades so as to cover two shear blades with the discharge from one spray head. A lubricant, such as a liquid detergent, is mixed or injected cyclically into the water in response to each cutting cycle of the shear mechanism. This ability to inject a cleansing, lubricating and rust-inhibiting material into the stream of water is disclosed as being an improvement over the mode of operation of a shear spray mechanism of the type disclosed in U.S. Pat. No. 2,230,609 dated Feb. 4, 1941.

With the foregoing in view, it is an object of the present invention to provide a more closely controlled shear spraying system which will maintain an oil to water ratio of a preset valve over a wide flow range. Additionally, it is an object of this invention to provide a novel mixing and distributing block for providing a system which will handle nonsoluble oil in water and distribute.

DETAILED DESCRIPTION OF THE DRAWINGS

Figure 1:
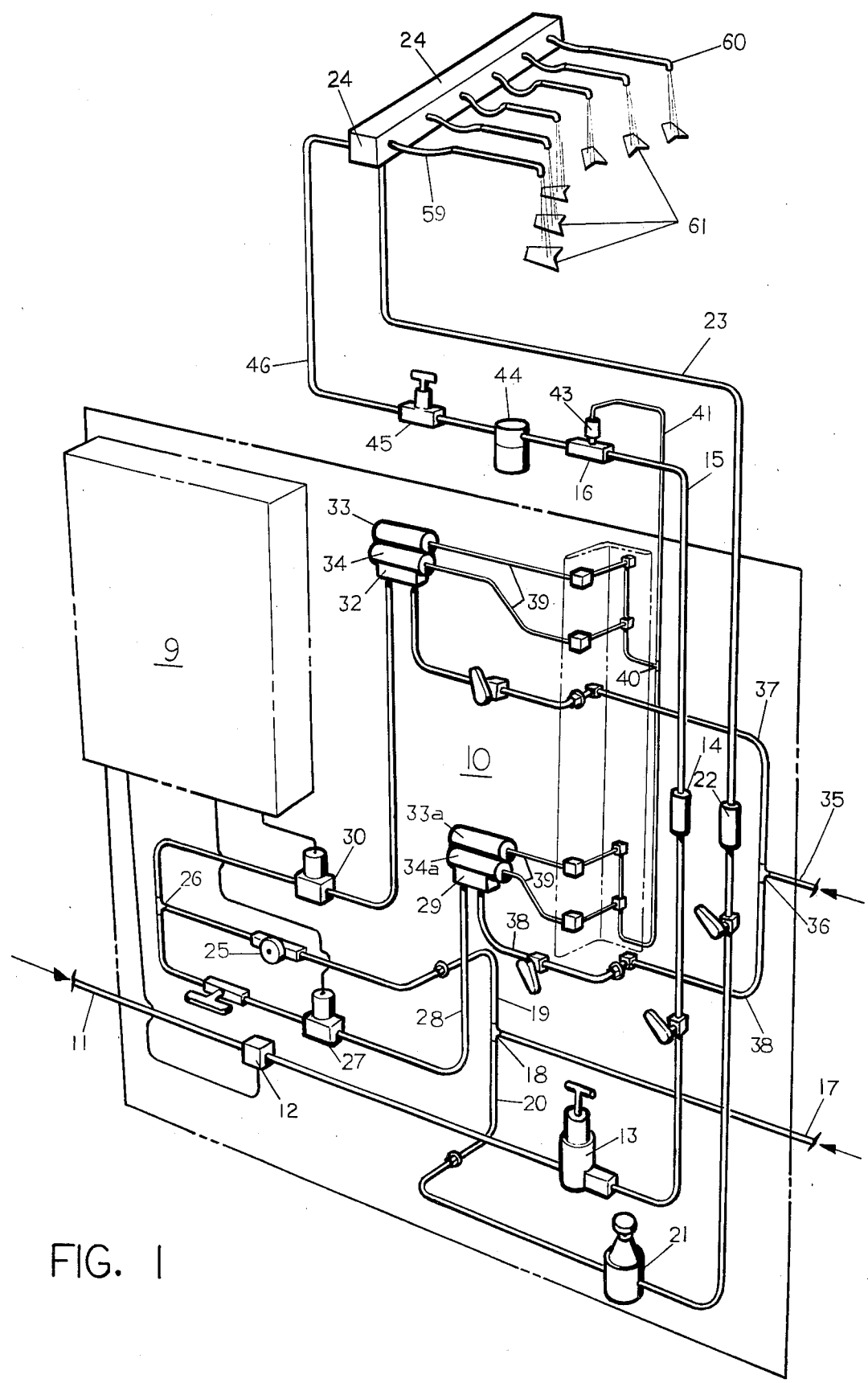
FIG. 1 is a schematic, three-quarter view of the oil in water ratio controller with its connections to a distributing and mixing block and plural shear spray nozzles.

With particular reference to FIG. 1, there is shown a control panel generally designated 9. The control panel 9 contains the control logic and circuitry to be described in greater detail later, and is shown mounted to a support plate 10. The plate 10 serves as the mount for a water supply connected thereto through pipe 11. The incoming water passes through a flow meter 12 and a throttle valve 13 and then to a check valve 14. After passing through the check valve 14, the water goes through a pipe 15 which is connected to a "T" 16. In addition to the water pipe extending past the control panel, there is also an air pipe 17. The air pipe 17 is connected to a "T" 18 which has two outlet conduits 19 and 20 connected thereto. The conduit 20 extends through a throttle valve 21 and thence the air passes to a check valve 22. Air passing through the check valve 22 will go through a pipe 23 which will extend from the area of the control panel to a mixing block 24 (to be described in detail with respect to FIGS. 2-4). The other conduit 19 from the "T" 18 which is also connected to the air supply passes through a regulator 25 and is split into two streams at a "T" 26. The air flow from the two branches of the "T" 26 where one of the flows passes through a solenoid operated valve 27 and then by way of a pipe 28 to a mounting member 29. The other branch of the air pipe from the "T" 26 also goes through a solenoid operated valve 30 and thence through a pipe 31 to a second mounting member 32. The mounting members are supports for two air operated servo meters which functionally are a pair of oil injectors 33 and 34. The injectors associated with the mount 29 have been designated 33(a) and 34(a), while those associated with the member 32 carry the reference numerals 33 and 34. Oil is connected to enter the control panel mount 9 through an inlet pipe 35. Inlet pipe 35 branches at "T" 36 into a pair of lines 37 and 38 which are connected to the mounting members 29 and 32 for the injectors 33, 33(a), and 34, 34(a). The output of the injectors 33, 33(a), and 34, 34(a) are through relatively small diameter oil lines 39. All of the oil lines 39 come together at a "T" 40 with an outlet oil line 41 extending therefrom through a check valve in advance of an injection nozzle 43 connecting to the "T" 16. The outlet from the "T" 16 passes through a filter 44 and regulating throttle valve 45 before passing to an inlet to the block 24 through a pipe 46.

Figure 4:
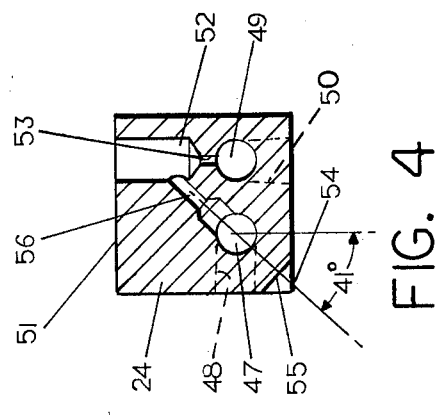
FIG. 4 is a cross-section view taken at line 4—4 of FIG. 3.
Figure 2:
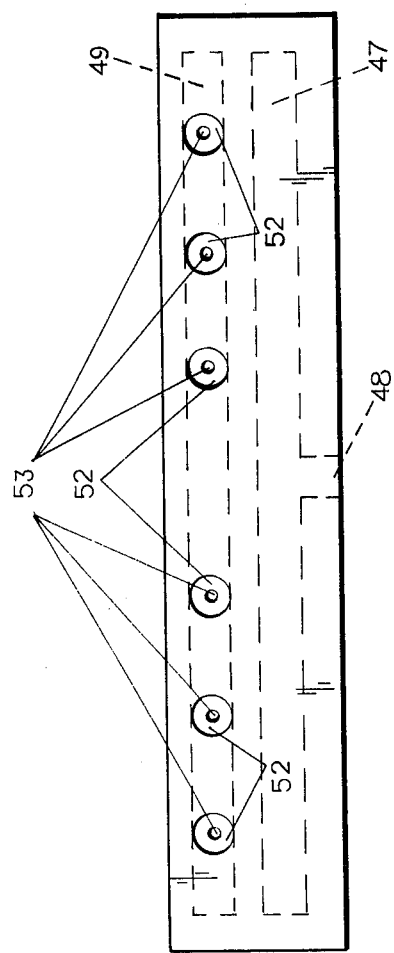
FIG. 2 is a top plan view of the mixing and distributing block of the invention.

With particular reference to FIG. 2 there is shown a generally rectangular block 24. The block 24 is provided with two bores which extend through the length thereof and have their ends plugged. The one bore 47 has the air supply line 23 connected thereto by way of a threaded inlet 48. The other bore 49 has the oil-water line 46 connected thereto through a threaded connection 50. As best seen in FIG. 4, the bore 49 has six spaced apart holes drilled vertically downward therein from the upper face 51 of the block 24. The six spaced apart holes from internally threaded openings through the face 51 of the block 24 and extended downward to form chambers 52, which in turn are connected through a relatively small metering orifice 53, of approximately 1/16 of an inch diameter, to the bore 49 containing the oil-water mixture.

Figure 3:
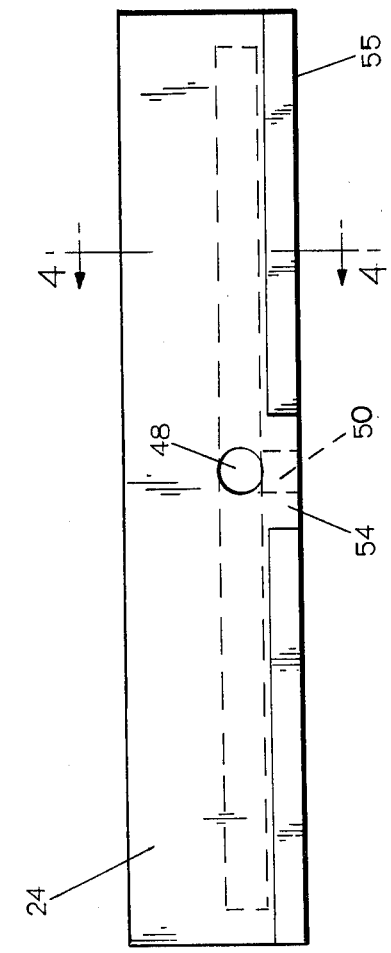
FIG. 3 is the side elevational view of the block of FIG. 2.

One corner of the block 24 is cut at an angle, as best seen in FIGS. 3 and 4 along substantially the entire face area with the exception of a center portion 54 which remains squared off. The cut off portion provides a face 55 which is at an angle of 41° with respect to a plane intersecting the center-lines of both bores 47 and 49. This face 55 provides the reference surface through which six air connecting orifices 56 are drilled between the bore 47 and the chambers 52. As best shown in FIG. 4, the air enters the chambers 52, at an angle, through a slightly larger orifice 56 compared to the size of the orifice 53 which connects the chamber 52 with the oil and water containing bore 49. With this arrangement it can be seen that in chamber 52 the oil and water mixture will be entrained in the air passing therethrough and each of the chambers 52 is connected by a flexible hose 59 to one of a plurality of spray heads 60. Each of the spray heads 60 will direct its spray toward a respective shear blade, schematically illustrated at 61. It should be understood that there will be a spray head for each shear blade involved and in the presently disclosed set up, the mechanism is for spraying and lubricating three sets, or pairs, of shear blades which will provide the mechanism for shearing three gobs of molten glass simultaneously.

In order to provide the proper degree of mixing and to insure that the nonsoluble oil-water mixture provides a fairly uniform spray through the spray heads, it has been found that with the configuration of the mixing block shown with orifice 53 of approximately 1/16 of an inch, and the orifice 56 with approximately an eighth of an inch diameter, that a uniformity from nozzle to nozzle can be maintained within plus or minus 2 percent. In addition, it has been determined that with the specific mixing block configuration and with the ratio controller associated therewith, a saving in the quantity of oil used per day and the quantity of water as well has been experienced over that which was used normally in other oil-water blade cooling systems.

Figure 5:
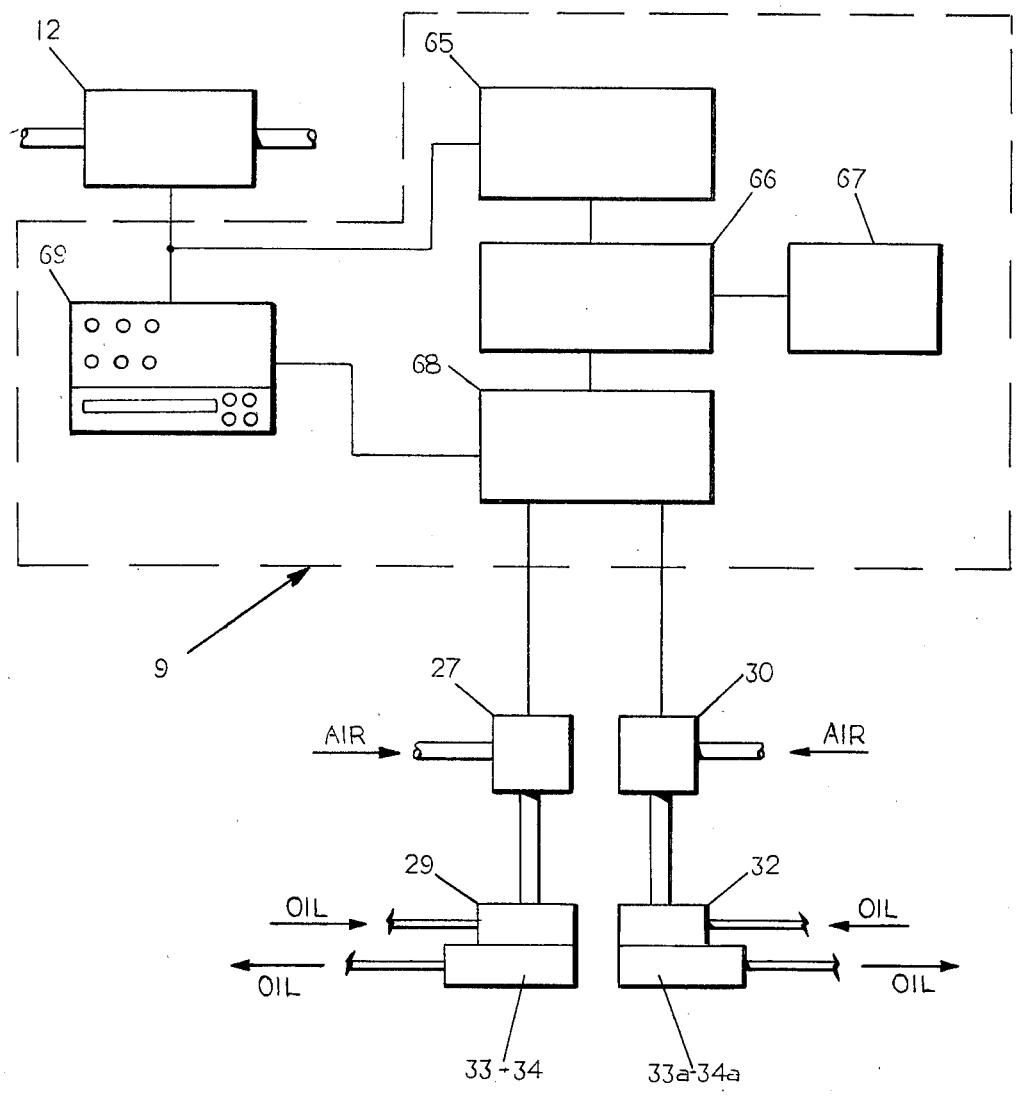
FIG. 5 is a schematic diagram of the control system for the invention.

With particular reference to FIG. 5, the operational functions of the control system will be described. Flow meter 12 is of the type which provides digital output signals and feeds these to the controller 9. The controller is of the type that will divide the signals received from the flow meter into other signal which are representative of a function of the digital input; and provides an output signal representing, in effect, one oil injection. This signal, or set of signals, is then compared with a set ratio that is previously set into the controller and when the comparison is valid, an output signal will be given to the mechanism to actuate both solenoids 27 and 30 to provide air signals to the mouths 29 and 32 to drive the positive displacement injection devices 33 and 34. The injection devices, called "servo meters", in fact are the air operated, positive displacement injectors 33, 33(a), and 34, 34(a). The drawing shows, in FIG. 1, that in fact there are 4 injectors for the supplying of oil into the water system in advance of the metering and mixing block. The principal reason for the showing of 4 injectors is that the capacity of the 4 will be sufficient to supply the oil to the water necessary to spray 3 pairs of shear blades. If the requirements are somewhat less, perhaps due in some instances to situations where the shear blades are not operated as frequently as in other situations, two injectors might be sufficient; in which case, only the single solenoid operated valve would be triggered and only one pair of injectors would be operated and the other system could be shut off. It is anticipated that in the event a greater number of shear blades, for example, 4 pairs of shear blades were to be used, it would be possible to add additional injectors and have them again operated in a similar fashion with an additional solenoid operated air valve. This would result in an increased output of oil in order to handle the increase use or flow of water. It can thus be seen that a system is provided in which, regardless of the change in liquid consumption due to greater or lesser use thereof, the injection of oil into the water will be maintained at the precise set ratio.

As previously alluded to, there is one particular reason why a non-water soluble oil is preferred to be used in shear blade cooling systems. This is the requirement that the oil-water overspray, that is collected usually in a pan positioned beneath the shear mechanism at the point where the blades are being sprayed, must be cleaned up before being disposed of. It is important, however, that any liquid which is introduced into a municipal waste system be free of oil and the only possible way that such oil can be extracted from the water at a fairly economically rate is to use an oil which is not dissolved in the water. If a soluble oil is used, then it is necessary to take any of the overspray of liquid materials that normally would be sent to the sewer through a system in which the oil would be emulsified then separated out from the water prior to the water being discharged into a municipal waste system. This, of course, is a costly system of waste water clean up compared to the system where the oil is not dissolved and can be mechanically separated.

I claim:

1. In apparatus for spraying an oil-water mixture onto a plurality of individual shear blades of a glass gob feeder wherein water, air and oil supply lines are provided, with the water and air lines being connected to a distributing and mixing block, the improvement comprising a flow meter in said water line, an oil-water ratio controller, an oil injector connected to the water line in advance of the mixing block for injecting oil into the water, means connecting the output of said flow meter to said ratio controller for actuating the oil injector in response to the quantity of water, a plurality of individual chambers in said mixing block each receiving a metered quantity of the oil-water mixture entrained in air, in individual spray nozzle for each shear blade, and means connecting an individual chamber to a spray nozzle whereby uniform oil-water mixtures are provided for each of the plurality of shear blades.

2. The apparatus of claim 1 wherein said means connecting the chambers to the spray heads comprises equal length conduits.

3. The apparatus of claim 1 wherein said flow meter interposed said water line provides digital signals proportional to water flow to said controller.

4. The apparatus of claim 3 comprising means in said controller for dividing said signals from said flow meter into oil injection signals; and means comparing said signals to a preset number representing a particular ratio; and output signal means from said controller connected to said injecting means for actuating said oil injector.

5. The apparatus of claim 3 further including;

means for dividing said signals from said flow meter into oil injection signals, comparator means receiving said injection signals and comparing said signals to a preset number representing a particular ratio; and means connected to said comparator for changing the ratio of oil to water by changing said preset number in said comparator.

6. The apparatus for mixing oil in water and entraining the mixture in air for equal distribution to a plurality of individual spray heads comprising an elongated, generally rectangular, block having two separate passages extending the length thereof;

means connecting the mid point of one of said passages to an air supply;

means connecting the mid point of said other passage to an oil-water mixture; a plurality of chambers formed in said block and symmetrically disposed along the length thereof, metering orifices connecting said passages to said chambers along said block, and means connecting an individual spray head to each chamber.

7. The apparatus of claim 6 wherein said metering orifice from said air containing passage to each said chamber is at an acute angle thereto.

8. The apparatus of claim 7 wherein said air metering orifice extends at an angle between 38° and 45° to the direction of flow of the oil-water mixture.

9. The apparatus of claim 8 wherein said angle is 41°.

10. The apparatus of claim 6 wherein said means connecting the chambers to individual spray heads are flexible conduits.

11. The apparatus of claim 10 wherein said flexible conduits are of equal lengths and said nozzles overlie individual shear blades at their retracted position.

* * * * *